United States Patent
Delaney et al.

(10) Patent No.: US 6,389,370 B1
(45) Date of Patent: May 14, 2002

(54) SYSTEM AND METHOD FOR DETERMINING WHICH OBJECTS IN A SET OF OBJECTS SHOULD BE PROCESSED

(75) Inventors: Kurt A. Delaney, Loveland; Paul L. Dineen, Ft. Collins, both of CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/395,500

(22) Filed: Sep. 14, 1999

(51) Int. Cl.⁷ ................................................ G06F 9/45
(52) U.S. Cl. .................. 702/186; 702/108; 702/117; 702/121; 702/182; 703/21; 700/28; 714/25
(58) Field of Search ................. 702/108, 117–119, 702/121, 122, 123, 182, 183–188, FOR 103, FOR 104, FOR 134, FOR 135, FOR 155, FOR 170, FOR 171; 703/21, 22, 24, 27; 700/28, 32, 108, 95; 714/25, 47

(56) References Cited

U.S. PATENT DOCUMENTS

| | | | | |
|---|---|---|---|---|
| 5,287,284 A | * | 2/1994 | Sugino et al. | 364/468 |
| 5,506,955 A | * | 4/1996 | Chen et al. | 395/183.02 |
| 5,557,547 A | * | 9/1996 | Phaal | 364/551.01 |
| 5,596,716 A | * | 1/1997 | Byers et al. | 395/185.01 |
| 5,748,878 A | * | 5/1998 | Rees et al. | 395/183.14 |
| 5,748,882 A | * | 5/1998 | Huang | 395/184.01 |
| 5,761,411 A | * | 6/1998 | Teague et al. | 395/184.01 |
| 5,867,714 A | * | 2/1999 | Todd et al. | 395/712 |
| 5,903,759 A | * | 5/1999 | Sun et al. | 395/704 |
| 5,974,565 A | * | 10/1999 | Okuhara et al. | 714/11 |
| 6,002,854 A | * | 12/1999 | Lynch et al. | 395/500.01 |
| 6,003,081 A | * | 12/1999 | Cromer et al. | 709/224 |
| 6,161,200 A | * | 12/2000 | Rees et al. | 714/38 |
| 6,182,249 B1 | * | 1/2001 | Wookey et al. | 714/47 |
| 6,189,142 B1 | * | 2/2001 | Johnston et al. | 714/4 |
| 6,199,204 B1 | * | 3/2001 | Donohue | 717/11 |

\* cited by examiner

*Primary Examiner*—Marc S. Hoff
*Assistant Examiner*—Carol S Tsai

(57) ABSTRACT

The present invention is generally directed to a system and method for determining whether components of a computer system should be analyzed for updates and repairs. In accordance with one aspect of the invention, a method evaluates a configuration object containing an identification of components installed on the computer system. The method also evaluates an analyzer object, containing information about an analyzer, to determine whether the analyzer operates upon the system, based on the characteristics of the system and the characteristics sought by the analyzer. Then, the method evaluates an update object, containing information identifying the last time that the components of the computer system were analyzed by the analyzer, to determine whether the analyzer should be run again. The method also evaluates a global data source. The result of this evaluation determines which additional systems should be analyzed. This determination is based on the particular changes in the global data source since the last analysis. In the preferred embodiment, an analyzer is a program that evaluates a system configuration to determine whether there are certain errors, defects, potential errors, or potential defects in the configuration.

22 Claims, 8 Drawing Sheets

SYSTEM AND METHOD FOR DETERMINING WHICH OBJECTS IN A SET OF OBJECTS SHOULD BE PROCESSED

BACKGROUND OF THE INVENTION

1. Field of the Invention

The present invention generally relates to computer systems, and more particularly to a system and method for determining which objects in a set of objects should be processed.

2. Discussion of the Related Art

In recent years, the field of computer systems and computer programming has grown exponentially. With computing speeds and technology ever increasing, the complexity and sophistication of computer programs is increasing commensurately. Due to a number of factors, including increased product sophistication, hurried deadlines to market, inadequate testing, etc., many computer programs are released with various defects, which are later discovered. A defect is generally termed as either a "critical" or "non-critical" defect, depending upon the ramifications of the defect. Defects that may corrupt system resources, or even crash a system altogether, are termed "critical," while other more benign defects are termed "non-critical."

In addition to latent program defects, other defects or problems sometimes arise when certain combinations of software packages are installed on certain computer systems. As is known, other defects, problems, and complications arise, with the increasing complexity of computing systems.

As is known, defects are often corrected through software "patches," which are programs that install over a program containing a defect. Specifically, patches are designed to integrate into a program and replace known, existing defects. For a given software program, particularly after the program has been available for a long time, there are often a number of identified defects, and correspondingly a number of patches. Indeed, sometimes patches are created to replace other patches, for a given program or configuration. At other times patches may be recalled.

As is known, other defects may exist, in addition to software defects, or those related to software patches. For example, certain software components may be improperly installed on a particular system. In addition, there may be firmware problems, hardware problems, or configuration errors (failure to properly install components). In this past, solutions to these types of problems were often reactive, rather than proactive. In this regard, often it is not until a computer user encounters a problem and requests technical support that a solution is provided. Unfortunately, "downtime" is often encountered in such systems and situations.

Accordingly, there is a desire to provide a system and method for proactively (and efficiently) analyzing a system configuration to determine whether there are any deficiencies or defects in a computer system (including, but not limited to, software defects) that need to be corrected or updated.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a system and method for determining whether components of a computer system should be analyzed for updates and repairs. In accordance with one aspect of the invention, a method evaluates a configuration to determine the characteristics of the computer system. The method also evaluates an analyzer object, containing information about an analyzer, to determine the characteristics that must be possessed by any system to be analyzed by that analizer. Then, the method evaluates an update object, containing information identifying the last time that the components of the computer system were analyzed by the analyzer, to determine whether the analyzer should be run again.

In the preferred embodiment, an analyzer is a program that evaluates a system configuration to determine whether there are certain errors, defects, potential errors, or potential defects in the configuration. In this respect, errors or defects can arise for a variety of reasons. A given analyzer will preferably be configured to evaluate a given configuration for a given error. Therefore; in a system constructed in accordance with one aspect of the invention, there may be a number of analyzers, each uniquely configured to evaluate for a different error or defect. In such a system, the inventive method will preferably determine which one or ones of the plurality of analyzers should be run for a given system configuration.

In one embodiment various objects or files may be utilized to store various information. For example, a configuration object may be used to store configuration data about a given, target computer system. Such a configuration object may include component codes to uniquely identify the kind of data it contains. The object may also include a timestamp associated with each component code to indicate when that component was last modified or updated. Likewise, an analyzer object may be included to define the various analyzers that may be run. The analyzer may associate with each analyzer a list of component codes, which pertain to the associated analyzer. An update object may also be provided to identify information such as when each analyzer was run on a given object.

In accordance with other aspects of the invention, a computer system may be provided and configured to execute the method summarized above. Likewise, and in accordance with another aspect of the invention, a computer readable medium may be provided having program code to specifically configure a computer to carry out the method summarized above.

DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENT

Figure 1A:
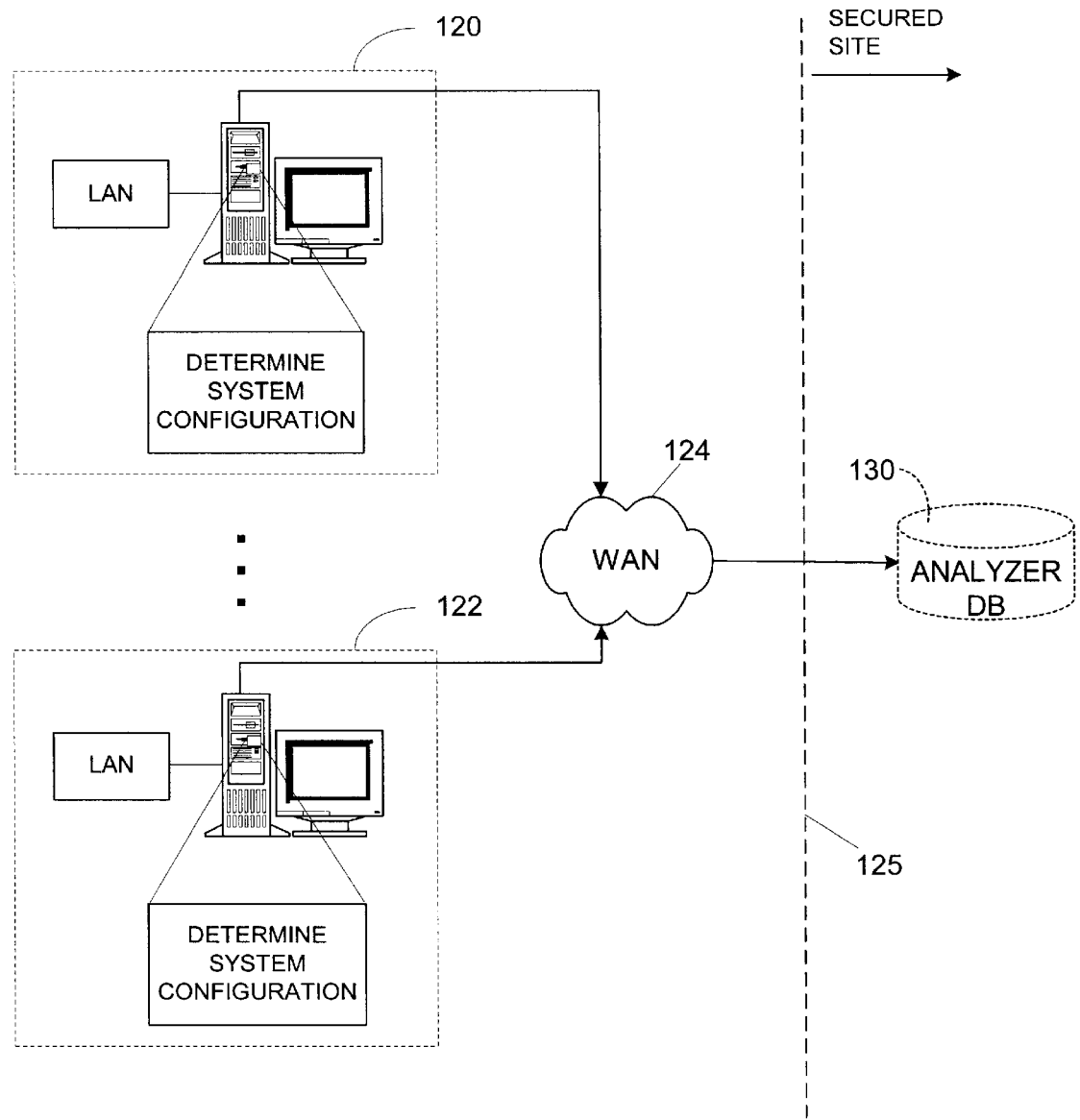
FIGS. 1A and 1B collectively comprise a block diagram of a system illustrating a computing environment in which the system and method of the present invention may operate.

Having summarized various aspects of the present invention above, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Figure 1B:
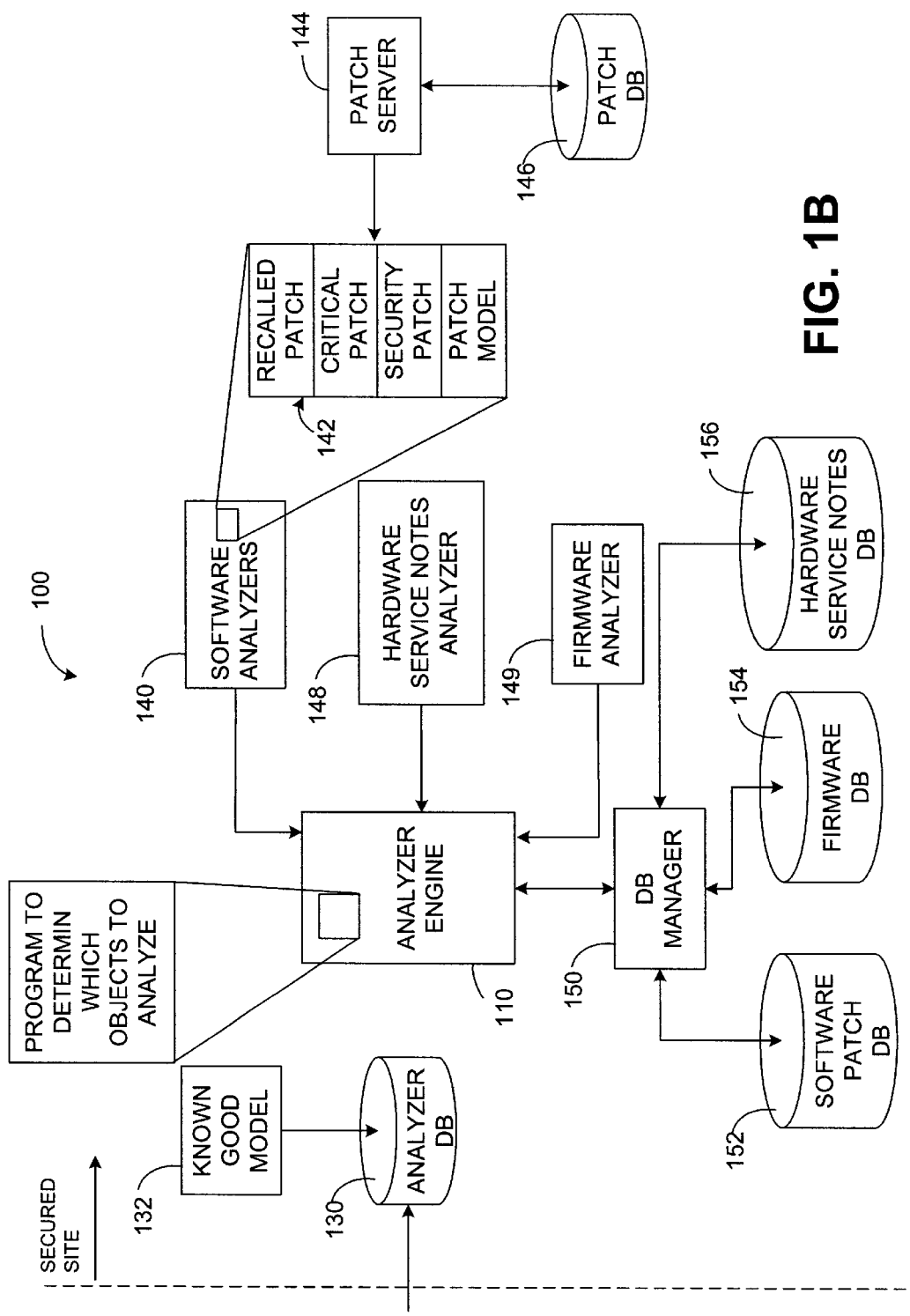

Turning now to the drawings, reference is made to FIGS. 1A and 1B, which collectively comprise a block diagram illustrating a system 100, which forms the environment of the present invention. In the preferred embodiment, the present invention operates in a system 100 that is designed to evaluate the configuration of one or more computer systems and determine if there are actual or potential errors in the configuration. As is known, such errors may reside in software, hardware, or firmware. Often such errors arise when a user of a computer system attempts to install new software on a system. Errors may arise because the installation was performed improperly, the new software conflicts with previously installed software, or for a variety of other reasons. For example, if a computer configuration is analyzed, and it is determined that two different, incompatible software programs have been installed on the computer system, then such a configuration may be identified as in need of "repair." The recommended repair could be to uninstall one of the software programs. Alternatively, a patch may exist that, if installed, may allow the two otherwise incompatible software programs to run together. Thus, the recommended repair may be the installation of such a patch.

Although other types of errors and defects may be identified, for purposes of illustration herein, software patches will be most often referenced. It is should be appreciated, however, that the concepts and teachings of the present invention, as illustrated herein, are not so limited, but rather expand to other, analogous features of objects. It will be further appreciated that system configuration defects may arise even when no additional software has been added to a given computer system. For example, if a computer system is properly configured with software, the later release of a critical patch for the software installed on that computer will thereafter result in an identification of that computer system as having a defective configuration (e.g., a configuration that does not have the critical patch installed).

It is an object of the system 100 to evaluate the configuration of one or more computer systems 120 and 122 to determine whether there are any defects, errors, or potential errors therein. Since the various computer systems 120 and 122 may be geographically dispersed all over the United States, and even the world, communication from the computer systems 120 and 122 to the system 100 may take place through a wide area network (WAN) 124. In one embodiment, software is provided to be executed on the computer systems 120 and 122 to identify the configuration of the particular computer system. That configuration information may then be relayed to the system 100 of the illustrated embodiment. The system 100 may then evaluate the configuration of the various computer systems 120 and 122 to determine whether those configurations are up to date, or whether they contain errors, defects, or potential errors or defects. It should be appreciated that the computer systems 120 and 122 may be stand-alone systems, or may be servers of a local area network (LAN), as illustrated. Indeed, the preferred embodiment of the present invention operates to identify potential configuration errors associated with Hewlett-Packard 9000 Series 800 computer systems, which are servers. However, it should be appreciated that the inventive concepts are not limited to servers or such specific computer systems, but rather generally apply to a much broader range of computing systems.

In the system 100 of the illustrated embodiment, a database 130 is provided to receive communications from the WAN 124. Preferably, a firewall 125 is provided, so that the components of the system 100 reside at a secured site. The database 130 may receive information from the plurality of computers 120 and 122, which information may be retrieved and analyzed by an "engine" 110. In this regard, reference data for a "known good model" 132 may be stored and accessible by the database 130. It should be appreciated that the reference data for the known good model may be updated on a periodic and/or continuous basis, as additional patches and other errors are identified for various system configurations. The engine 110 comprises the processing part of the system 100 and utilizes a variety of components in carrying out its processing tasks. These components may include a software analyzer 140, a hardware service notes analyzer 148, and a firmware analyzer 149. Other analyzers (not shown) may also be provided consistent with the concepts of the present invention.

To further illustrate, only in connection with the software analyzers 140, the software analyzers 140 may further comprise the patch analizers 142.

The patch analyzers 142 may include several types of patch analyzers including a recalled patch analyzer, a critical patch analyzer, a security patch analyzer, and a patch model analyzer. The recalled patch analyzer may check for patches that are installed on a system, which have been marked as "recalled." In the preferred embodiment, this analyzer only identifies, as a defective condition, systems in which recalled patches have been installed and are current. Thus, if later patches have been installed over the recalled patch, then a defective condition would not be identified. The critical patch analyzer checks for patches that are applicable to the target system (i.e., system that has installed file sets that match the file sets of the patch), and which are marked as "critical." In such systems, the critical patch analyzer may report that a critical fix has not been installed on this system. The security patch analyzer checks for patches that are both applicable to the target system, and considered as a "security" patch (e.g., a patch that has been identified as being necessary for system security). Finally, the patch model analyzer determines whether a recommended set of patches is installed on a target system. This is a general-purpose analyzer that is configured to identify systems that do not match a specific patch model. Examples of such models may include: (1) a minimum set of patches required for Y2k compliance, (2) certified or commended patches for a third party application, (3) patches recommended for systems with certain, identified software installed, (4) etc. A patch server 144 may provide information about such patches. Further, a patch database 146 may be provided in connection with the patch analyzers 140. The patch database 146 may contain a variety of data or other information regarding various patches. It should be appreciated that similar types of analyzers may be provided in connection with the hardware service notes analyzer 148 and the firmware analyzer 149, consistent with the inventive concepts. However, such additional analyzers need not be described herein in order to understand and appreciate the teachings of the present invention.

Other software, firmware, and hardware service notes information may be stored in separate databases 152, 154, and 156, respectively, for access and use by the engine 110 and analyzers 140. 148, 149 in carrying out the various functions and operations of the engine 110. Such data may be managed and accessed through the control of a database manager 150.

It will be appreciated that there may be a variety of tasks and operations performed by the engine 10, which need not be described herein since they do not directly relate to the inventive features of the present invention. Rather, the diagram of FIG. 1 and the discussion provided above has been provided purely for purposes of better illustrating the environment in which the present invention operates. In general, the engine 110 periodically (e.g. daily) determines which analyzers (e.g. 140, 148, 149, etc.) to run, and upon which objects, stored within database 130, should be processed. In this regard, it should be appreciated that the number of computer systems 120 and 122 may be a very substantial number. Therefore, to separately analyze the configuration of each system using the various analyzers 140, 148, and 149 would be extremely time and resource intensive. Therefore, the present invention utilizes an algorithm, 200 which determines which objects (e.g. system configurations) to analyze, and to determine which analyzers 140, 148, and 149 are to analyze the various objects (stored within database 130).

Figure 2:
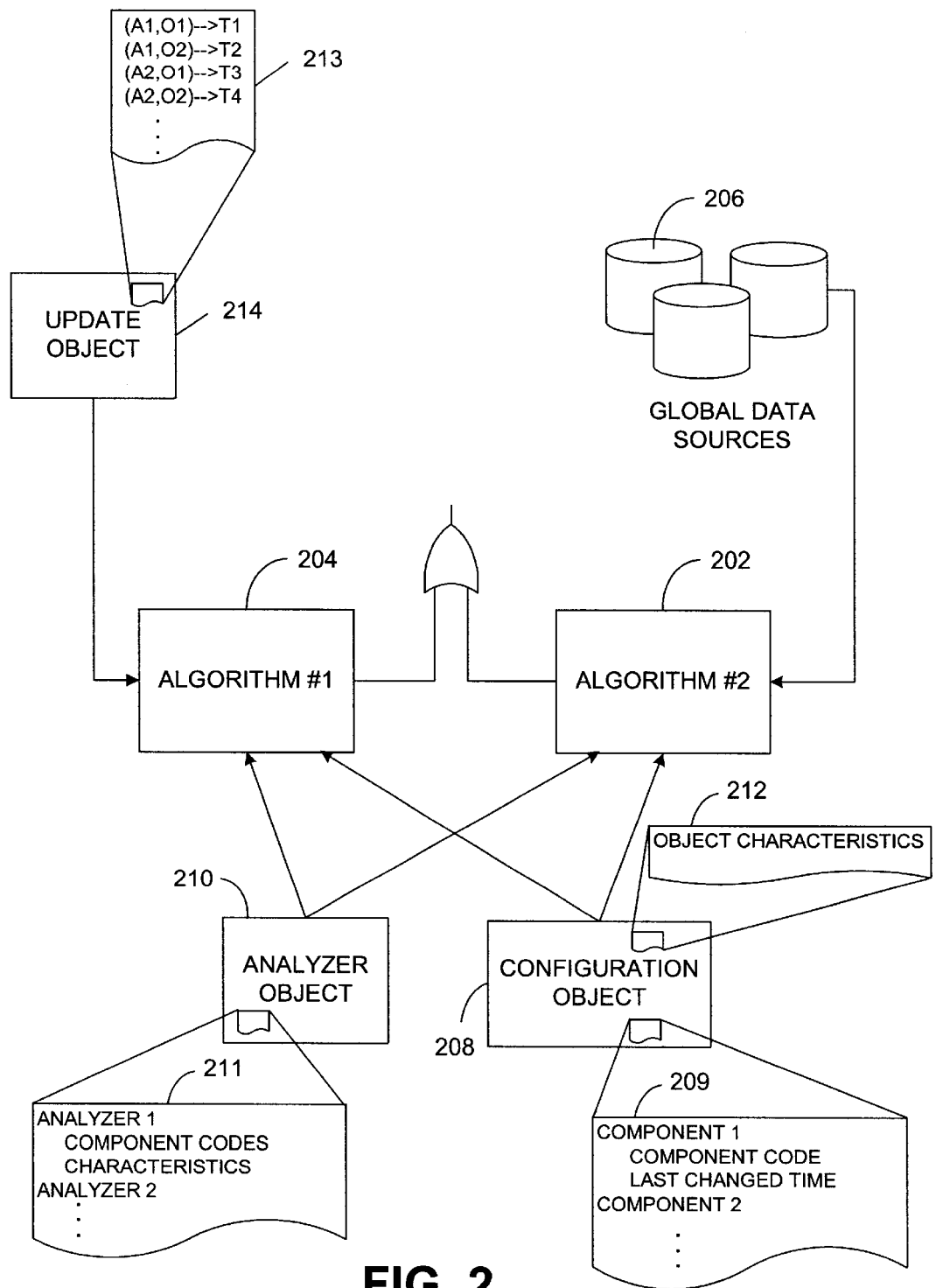
FIG. 2 is a block diagram illustrating the principal components of the present invention.

In this regard, reference is made to FIG. 2 which is a block diagram illustrating the method of the preferred embodiment. In this respect, the diagram of FIG. 2 has been somewhat generalized, as it should be appreciated that the inventive concepts may apply equally to environments outside that illustrated in FIG. 1. For example, the various system configurations, which are stored in database 130, are identified in FIG. 2 as "objects." Likewise, the various analyzers 140, 148, and 149 of FIG. 1B are denoted in FIG. 2 simply as "analyzers."

The preferred embodiment of the present invention utilizes two separate algorithms 202 and 204 and then compares the output of each. In affect, the output of each algorithm 202 and 204 is a yes/no or true/false value. These output values are ORed together. If either or both algorithms generate a true (or yes) value, then a given analyzer should be run against the configuration components of the given computer system.

Algorithms 202 and 204 utilize various data sources. These include a database of global data sources 206, configuration objects 208, analyzer objects 210, and update objects 214. The global data sources 206 comprise a database of information regarding various components and their updates. For example, data stored in the global data sources 206 may include patches and patch updates, firmware updates, service notes, and other similar information. As briefly discussed above, a service note is a notation made by service personnel regarding glitches, anomalies, bugs, etc. that have been identified in hardware, software, or firmware. For example, service personnel may troubleshoot a system and identify a compatibility problem between a monitor manufactured by company X and a graphics card manufactured by company Y. The service personnel may log this type of information in a service note under both the graphics card of company Y and the monitor of company X. For example the notation under the graphics card may simply read "do not use this graphics card with monitor X." Likewise, the notation under the monitor may read "do not use this monitor with graphics card Y." In a system constructed in accordance with the present invention, the graphics card and the monitor may both be identified by separate component codes (discussed below) in a configuration object (or configuration file) of a given computer system. The service notes, illustrated above, may be separately identified for each component in connection with a hardware analyzer. Once this service note has been logged and stored within the global data sources 206, and the hardware analyzer has been run on the given configuration object (i.e., the computer system), then the hardware analyzer need not be run against the configuration object again (assuming there are no changes to the configuration of the computer system or to the service notes portion of the global data source).

In keeping with the description of FIG. 2, the algorithms 202 and 204 both utilize information obtained from a configuration object 208 and an analyzer object 210. In one embodiment, each of these objects may be in the form of a data file that may be readily read by a computer system. The configuration object 208 may include a variety of information about a target computer system. Furthermore, the configuration object 208 may store configuration information in a variety of formats, consistent with the present invention. In accordance with one aspect of the present invention, however, the information stored in the configuration object 208 may include a file 209 containing a plurality of components. Each component may represent an identifiable object or item associated with a target computer system. These components may include hardware components, firmware components, software components, etc. With regard to software components, a unique component code may be assigned to identify different types of configuration information. With each component or data item code, a timestamp may also be provided to indicate the time at which the component was last changed or updated. Likewise, a data value called "objects characteristics" may also be provided to provide certain information about the given object. This "characteristic" information may include system information, such as whether the system is a computer, a router, a gateway. or some other device, as well as information identifying, for example, the operating system installed and executing on the system. Furthermore, the configuration object 208 may contain a large number of objects, corresponding to the large number of computer systems (e.g., computers 120 and 122 of FIG. 1) that may be evaluated by the present invention. It should be appreciated that a plurality of components (e.g., computer programs) may exist for a single object (e.g., computer system) in the configuration object 208.

An analyzer object 210 also provides data input to each of the algorithms 202 and 204 of the preferred embodiment. The analyzer object 210 includes an identification 211 of a plurality of analyzers that may be provided in connection with this system 100 of FIG. 1B. For each analyzer, a series of component codes and configuration object characteristics may be provided as well. As will be further described in connection with FIGS. 3 and 4, in determining whether a given analyzer should be run on a target computer system, the present invention may first determine whether, for a given analyzer, the characteristics associated with that analyzer have corresponding object characteristics within the configuration object 208. To further illustrate, suppose an analyzer is a patch analyzer that is configured to evaluate a computer system to determine whether any critical patch updates should be added to that computer. The characteristics associated with that analyzer (reference numeral 211) may include the characteristics associated the computer system (208). If the object characteristics (212) do not satisfy the analyzer's characteristics (211), the analyzer does not apply to the target computer system, and therefore the particular analyzer will not be run.

Finally, an update object 214 is provided which contains information regarding the last time that a given analyzer was run on a given component. In this regard, the update object 214 may include a file 213 containing a listing of associations between analyzers and components. For example, one of the illustrated entries is "(A1, O1)>T1." This entry is a shorthand notation indicating that Analyzer 1 was last run on object 1 at time T1. Therefore, if information relating to Component 1 has been updated (as reflected by the timestamp within the configuration file 209) since time T1, then algorithm 204 will output a true or yes value. Likewise, if data relevant to the particular analyzer and particular object is updated in the global data sources 206 since time T1 (as indicated by the timestamp in the configuration file 209), then algorithm 202 will output a yes or true value. Again, if either or both algorithms 202 and 204 output a yes or true value, this will be an indication that an analyzer under evaluation should be run on a target computer system (identified by the configuration file 209 of a configuration object 208).

Figure 3:
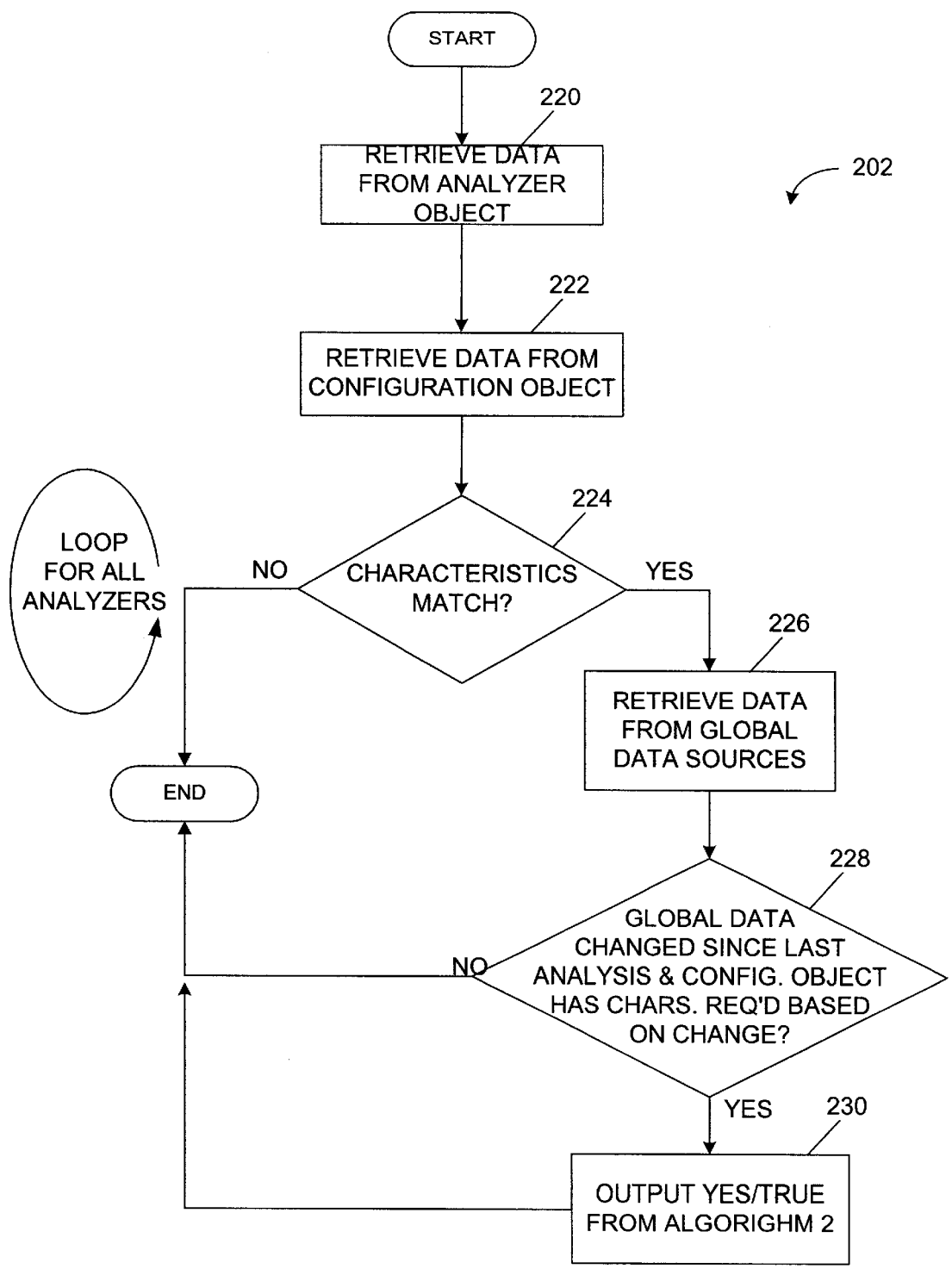
FIG. 3 is a flowchart illustrating the top-level functional operation of a first portion of a method for determining whether a given object (e.g., computer system) needs to be analyzed, in accordance with the invention.

To better illustrate the operation of algorithm 202, reference is made to FIG. 3, which is a flowchart illustrating the top-level functional operation of this algorithm. In accordance with one embodiment of the present invention, the algorithm may proceed by retrieving data from an analyzer object (step 220) and retrieving data from the configuration object (step 222). The algorithm 202 may then compare data retrieved from each of these objects to determine whether, for a given analyzer, component characteristics associated with that analyzer are satisfied by the component characteristics within the configuration object (step 224). If not, the algorithm may proceed to the next analyzer and repeat the evaluation of step 224, until all analyzers have been so evaluated. If, however, step 224 identifies satisfying component characteristics, then the algorithm may retrieve data from the global data sources (step 226). The algorithm may then determine whether the data stored within the global data sources has changed since the associated or relevant components were installed or last updated on the target computer system (step 228). This step may be performed by comparing the timestamp associated with the relevant components in the configuration object with the update date associated with the data. If the evaluation of step 228 indicates that the global data has, in fact, changed after the last time the analyzer analyzed the component and in a way that corresponds to the object's characteristics then algorithm 202 outputs a value of yes or true (step 230).

Figure 4:
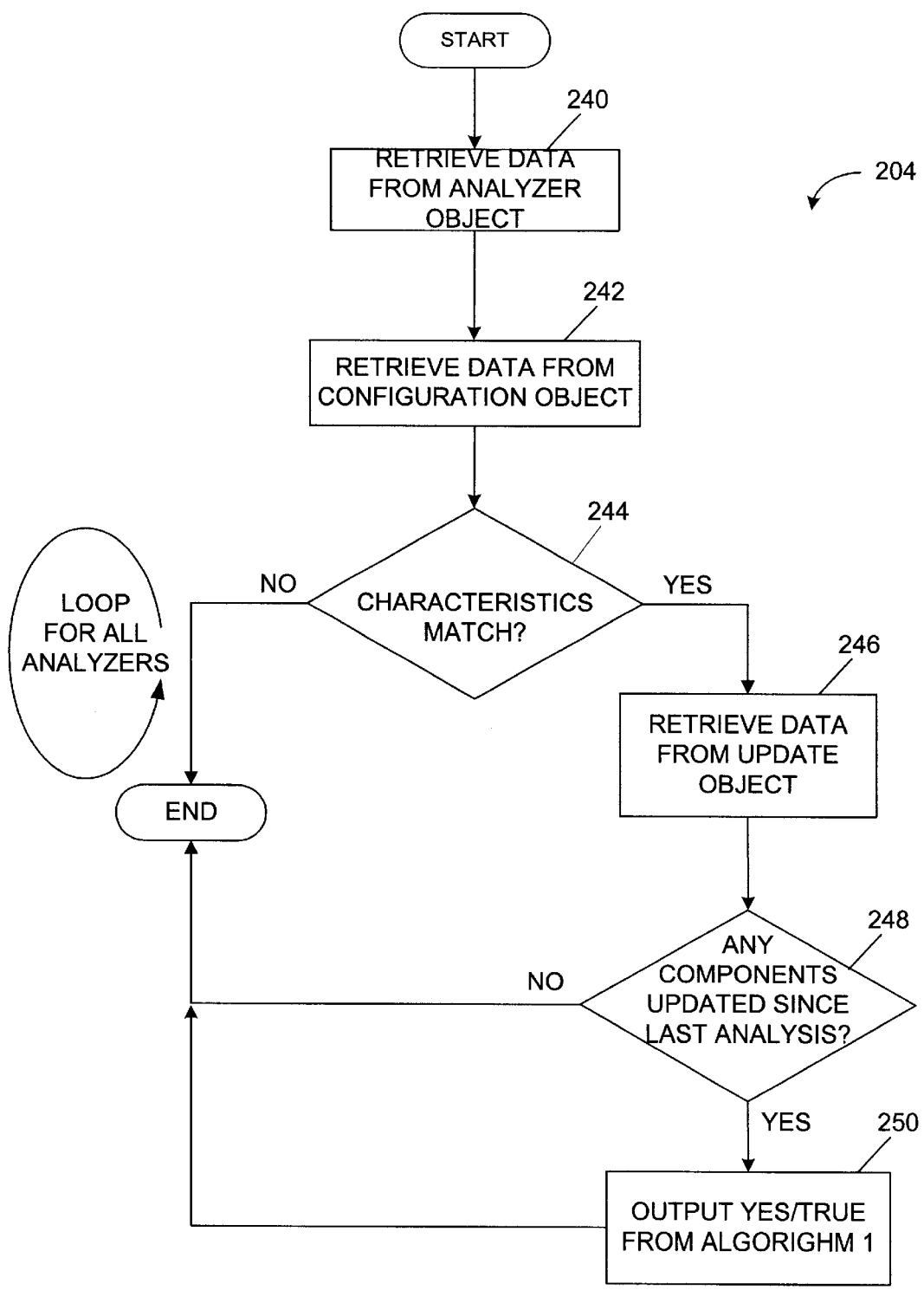
FIG. 4 is a flowchart illustrating the top-level functional operation of another portion of a method for determining whether a given object needs to be analyzed, in accordance with the invention.

Reference is now made to FIG. 4, which is a flowchart illustrating the top-level functional operation of algorithm 204. In one embodiment, steps 240, 242, and 244 may be identical to steps 220, 222 and 224 of FIG. 3. If the evaluation of step 244 results to yes, then data is retrieved from an update object (step 246). As previously mentioned, the update object indicates the last time that a given analyzer was executed upon a given object. After retrieving data from the update object, the algorithm may then compare the relevant timestamps of the update object to the relevant timestamps within the configuration object of the relevant or target computer system (step 248). If this step determines that any components of the computer system where changed, modified, or updated since the last time that the associated analyzer was executed upon the computer system, then algorithm 204 outputs a value of yes or true (step 250).

To provide a more concrete example, consider a software package installed on a computer system at a time T1. Then suppose, at some later time T2 a patch analyzer (analyzer 1) was run on the target computer system. Then suppose, at some later time T3 a patch was created for the software package and information about this patch was stored in the global data sources 206. In accordance with the flowchart discussed above, algorithm 202 would output a true or yes value, since the patch information stored in the global data sources would have been stored at a time later than time T2 (the time of last analysis). The output of algorithm 204 would be false or no, assuming there had been no updates of the configuration objects of interest to the analyzer. On the other hand, if a configuration object of interest to the analyzer had been updated since time T2 then the output of algorithm 204 would be true or yes.

Figure 5:
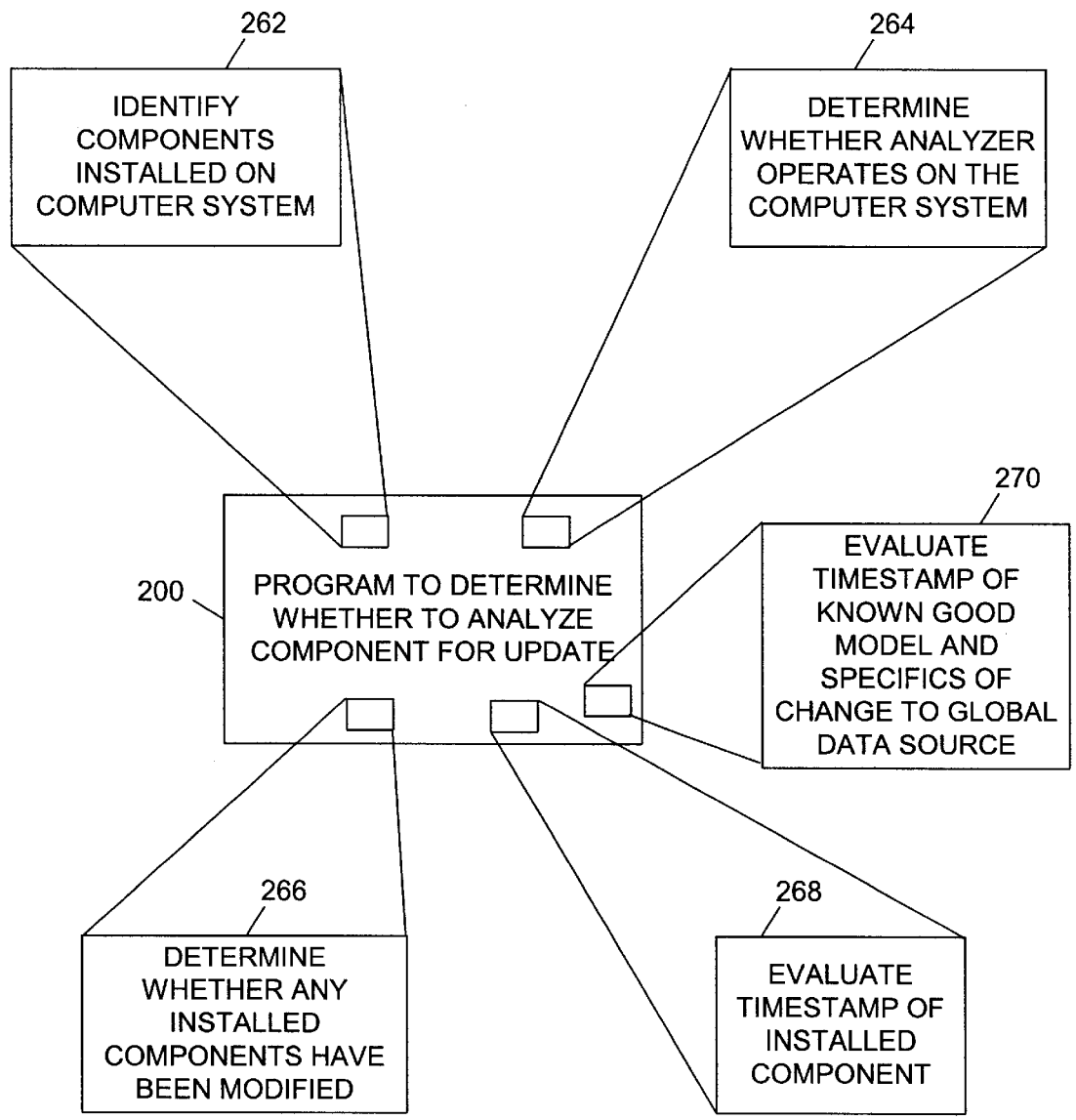
FIG. 5 is a diagram that illustrates certain segments that may be provided as part of a computer program constructed in accordance with one embodiment of the invention.
Figure 7:
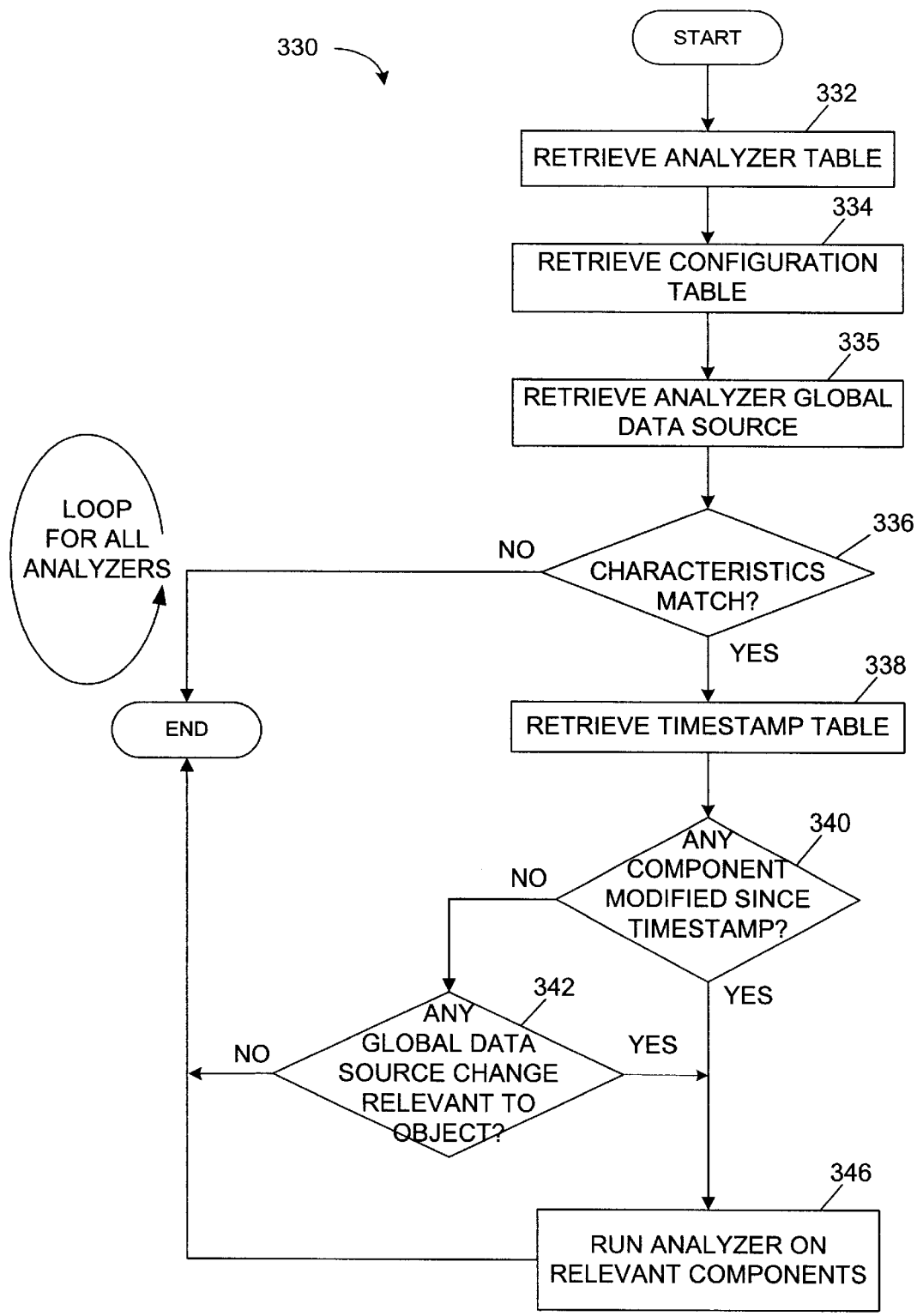
FIG. 7 is a flowchart illustrating the top-level functional operation of a method for determining whether a given object needs to be analyzed, in accordance with an alternative embodiment of the present invention.

Having described the method of the present invention, it will be appreciated that the steps illustrated in the flowchart of FIGS. 3, 4, and 7 are provided for purposes of illustration and are not deemed to be limiting on the broader aspects of the present invention. Indeed, the broader aspects of the present invention may be implemented using a variety of different approaches that are still consistent with the scope and content of the present invention. As illustrated in FIG. 5, a portion of the system is configured to determine whether certain objects should be analyzed. In the preferred embodiment, the system comprises software, which may be provided on a computer readable storage medium in a form of code segments that are particularly configured to perform various functions.

In this regard, reference is now made to FIG. 5, which illustrates certain functions that may be carried out by a system constructed in accordance with the teachings of the invention. For example, the program 200 for determining whether an analyzer should be run on a given object (e.g., computer system) may comprise a plurality of code segments including a segment 262 for identifying components installed on the computer system. In one embodiment, this segment may be implemented in multiple components (not specifically shown). For example, one component may be configured to control the analysis/evaluation of the computer system to determine the various components installed thereon, and store this information in a configuration object, such as a file. Another component, which may be executed from a different location, may be configured to later read this configuration object and identify therefrom the various components installed on the computer system from which the configuration object was derived. Another segment 264 may be provided for determining whether a given analyzer operates on the computer system, based on the characteristics of the analyzer and the computer system. Yet another segment 266 may be configured to determine whether any installed components have been modified since they were last analyzed. In connection with this segment, another segment 268 may be provided to evaluate a timestamp associated with this component. Still another segment 270 may be provided to evaluate a timestamp associated with a known good model (e.g., the most recent model available) and the specifics of that change. "Specifics" refer to the characteristics that a system must possess in order to be a candidate for analysis because of that change. Yet additional segments (not illustrated) may be provided in connection with the system of the present invention, as will be appreciated by persons of skill in the art in light of the teachings provided herein.

It should be appreciated that the flowcharts of FIGS. 3, 4, and 7 show the top-level operation of only one possible implementation of the methods of the present invention. In this regard, each block represents a module, segment, or portion of code, which comprises one or more executable instructions for implementing the specified logical function (s). It should also be noted that in some alternative implementations, the functions noted in the blocks might occur out of the order noted in FIGS. 3, 4, and 7. For example, two blocks shown in succession may in fact be executed substantially concurrently or the blocks may sometimes be executed in the reverse order, depending upon the functionality involved.

Figure 6:
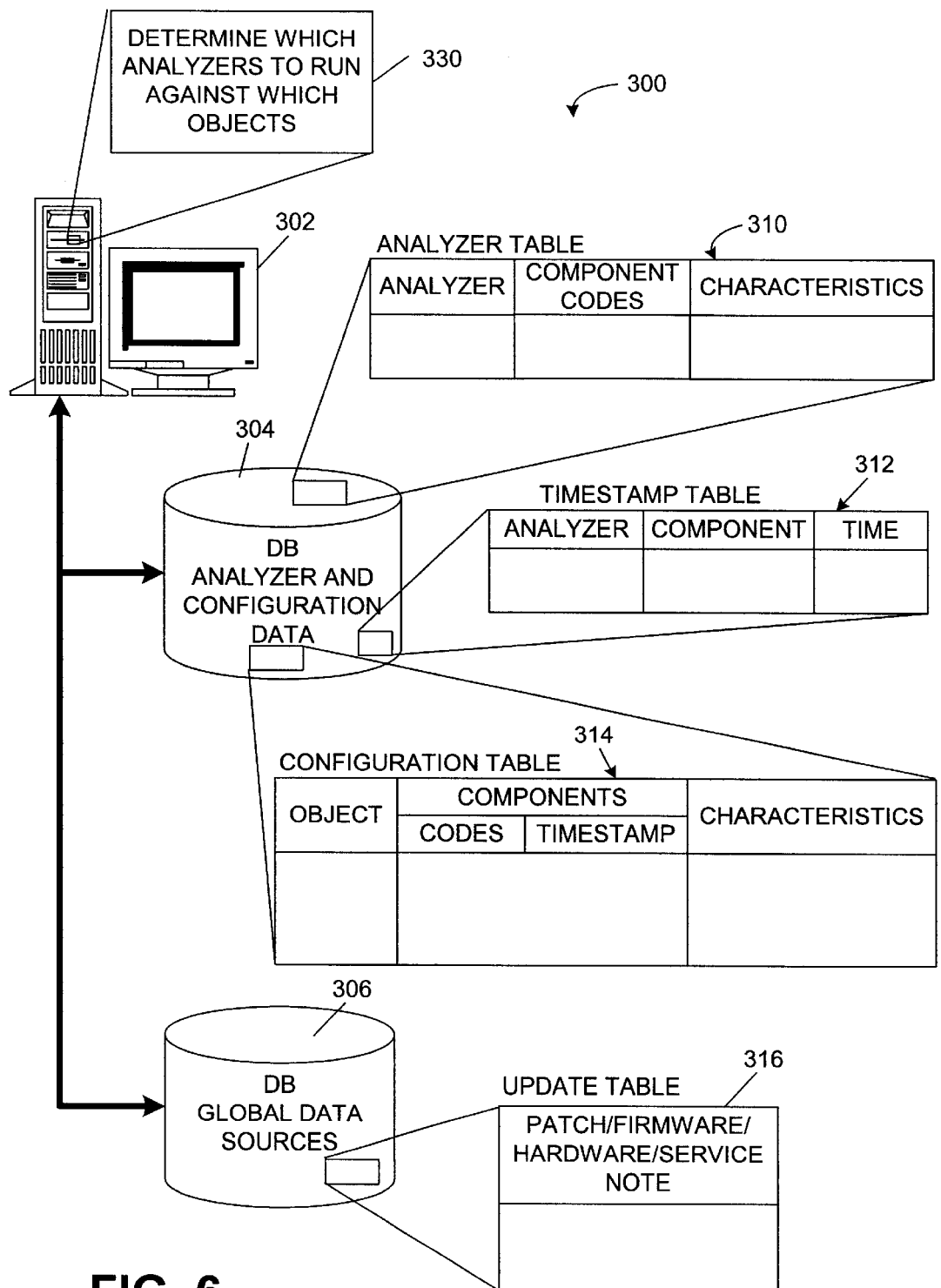
FIG. 6 is a block diagram illustrating an alternative embodiment of the present invention.

Having discussed the preferred embodiment of the present invention, it will be appreciated that various alternative embodiments may be implemented, consistent with the broader concepts and teachings of the present invention. A portion of one such system 300 is illustrated in FIG. 6. In this regard, FIG. 6 illustrates a computer 302 that includes software 330 that is configured to determine which analyzers should be run against which objects. The software 330 accesses a variety of information in making this determination. Preferably, this information is stored on one or more databases 304 and 306 that are disposed in communication with the computer system 302. Specifically, the data accessed by the software 330 includes data stored in an analyzer table 310, a timestamp table 312, a configuration table 314, and an update table 316. The tables of FIG. 6 loosely correspond to the objects and global data source of FIG. 2. In this regard, the analyzer table 310 loosely corresponds to the analyzer object. As illustrated, the analyzer table may include information pertaining to a plurality of analyzers, with each analyzer having associated component codes and characteristics. Likewise, the timestamp table 312 loosely corresponds to the update object of FIG. 2. This table may include information relating the time at which a given analyzer operated upon a given component or object. The configuration table 314 loosely corresponds to the configuration object of FIG. 2. This table may include data that relates various components stored on computer systems with characteristics of that computer system. Also associated with each component is a timestamp indicating when a component was last updated. Finally, the update table 316 loosely corresponds to the global data source of FIG. 2. This table may patch, firmware, hardware service note, or other information associated with the given analyzer.

Reference is now made to FIG. 7, which is a flowchart illustrating the top-level operation of a system constructed in accordance with FIG. 6. It will be appreciated from the brief summary of FIG. 7 that a system constructed in accordance with FIG. 6 operates very similar to that described above in connection with FIGS. 2–4. In this regard, a program 330 may begin execution by retrieving data from the analyzer table (step 332) and from the configuration table (step 334). The program 330 may then evaluate the data retrieved from these two tables to determine which configuration objects have the characteristics sought by the analyzer (step 336). If none, the evaluation for the current analyzer is complete, and step 336 is repeated for each successive analyzer. If, however, step 336 determines that there are, in fact, satisfying objects, then the program 330 may retrieve information from the timestamp table (step 338). From this information, the program may evaluate and determine whether any of the components of an object has been modified since the analyzer was last run on that object (step 340). If so, then the current analyzer is run on the relevant components (step 346). If not, the program determines whether any known good model change is relevant to the object (step 342). The program may consult the analyzer's global data source (retrieved in step 335) to determine whether the object should be analyzer. If so, then the current analyzer is run on the relevant components (step 346).

It should be appreciated from the foregoing discussion that the present invention provides a very efficient algorithm for determining whether a system analyzer should be run on a given target computer system. Indeed, in a system having a plurality of differing analyzers, the present invention provides an efficient method for determining which among these analyzers should be run on which target computer systems. It should be appreciated that the system and method of the present invention provide greatly improved efficiencies where a large number of computer systems are to be evaluated, and potentially updated.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A method for determining whether components of a computer system should be analyzed for updates and repairs, comprising the steps of:

evaluating a configuration object containing an identification of components installed on the computer system;

evaluating an analyzer object containing information about at least one analyzer to determine whether the at least one analyzer operates upon any of the components installed on the computer system;

evaluating an update object containing information about the last time that the components of the computer system were analyzed by each analyzer; and evaluating a global data source containing information against which the components of the computer system are compared.

2. The method of claim 1, wherein the step of evaluating a configuration object further includes the step of identifying component codes that uniquely correspond to components installed on the computer system.

3. The method of claim 2, wherein the step of evaluating a configuration object further includes the step of identifying time codes, associated with the component codes, that indicate when the associated components were last updated.

4. The method of claim 1, wherein the step of evaluating an analyzer object further includes the step of identifying component codes that uniquely correspond to components that are to be analyzed, and which may be installed on a computer system.

5. The method of claim 4, wherein the step of evaluating an analyzer object further includes the step of identifying object characteristics that identify system characteristics of the computer system that are relevant to the analyzer.

6. The method of claim 5, wherein the system characteristics include the computer system series and operating system revision.

7. The method of claim 1, wherein the computer system includes at least one selected from the group consisting of: a personal computer, a LAN server, a router, and a gateway.

8. The method of claim 3, wherein the step of evaluating an analyzer object further includes the step of identifying component codes that uniquely correspond to components that are to be analyzed, and which may be installed on a computer system.

9. The method of claim 8, wherein the step of evaluating an analyzer object further includes the step of identifying object characteristics that identify system characteristics of the computer system that are relevant to the analyzer.

10. The method of claim 9, wherein the step of evaluating an update object further includes the step of identifying when the analyzer was last run against a given system.

11. The method of claim 10, further including the step of indicating whether the analyzer should be run on the computer system.

12. The method of claim 11, wherein the step indicating whether the analyzer should be run on the components indicates that a given analyzer should be run on the object, if the time code associated with any of the object's components indicates a later date than that indicated by a corresponding time code in the timestamp table for the given analyzer and the given object.

13. The method of claim 1, wherein configuration object, the analyzer object, and the update object more specifically comprise a configuration file, an analyzer file, and an update file, respectively.

14. A computer readable medium containing program code for determining whether components of a computer system should be analyzed for updates and repairs comprising:

a first code segment configured to identify components installed on the computer system;

a second code segment configured to determine whether an analyzer operates upon the computer system, based on all characteristics satisfying characteristics sought by the analyzer;

a third code segment configured to determine whether any of the components have been modified since they were last analyzed by the analyzer; and a fourth code segment configured to determine whether the global data source for an analyzer has changed, and the specifics of that change.

15. The computer readable medium of claim 14, wherein the first segment is configured to evaluate a configuration object containing an identification of components on the computer system and an associated indication of the last time the component was updated.

16. The computer readable medium of claim 14, wherein the second segment is configured to evaluate an analyzer object containing an identification of at least one analyzer and at least one object, where it is determined if the analyzer applies to the object (based on characteristics being satisfied).

17. The computer readable medium of claim 16, wherein the at least one analyzer includes an analyzer selected from the group consisting of: a hardware service notes analyzer, a firmware analyzer, and a software analyzer.

18. The computer readable medium of claim 17, wherein the software analyzer includes one selected from the group consisting of: a recalled patch analyzer, a critical patch analyzer, a security patch analyzer, and a patch model analyzer.

19. The computer readable medium of claim 14, wherein the fourth code segment is configured to evaluate whether an analyzer object should be applied to a configuration object, based on the last time the analyzer analyzed that object and the last time that any of that object's configuration components that are of interest to the analyzer changed.

20. The computer readable medium of claim 19, further including a fifth segment that is configured to determine which computer systems should be analyzed, based on the specifics of the change to the global data source.

21. The computer readable medium of claim 20, further configured to combine the fourth and fifth code segments by an "OR" relationship to produce a multiplicity of configuration objects to be analyzed.

22. A computer system configured to execute the program code of the computer readable medium of claim 14.

* * * * *